Dec. 28, 1965 A. R. WRIGHT 3,225,650
APPARATUS FOR SCREENING FILMS, SLIDES AND THE LIKE
IN ADVERSE LIGHT CONDITIONS
Filed June 7, 1963
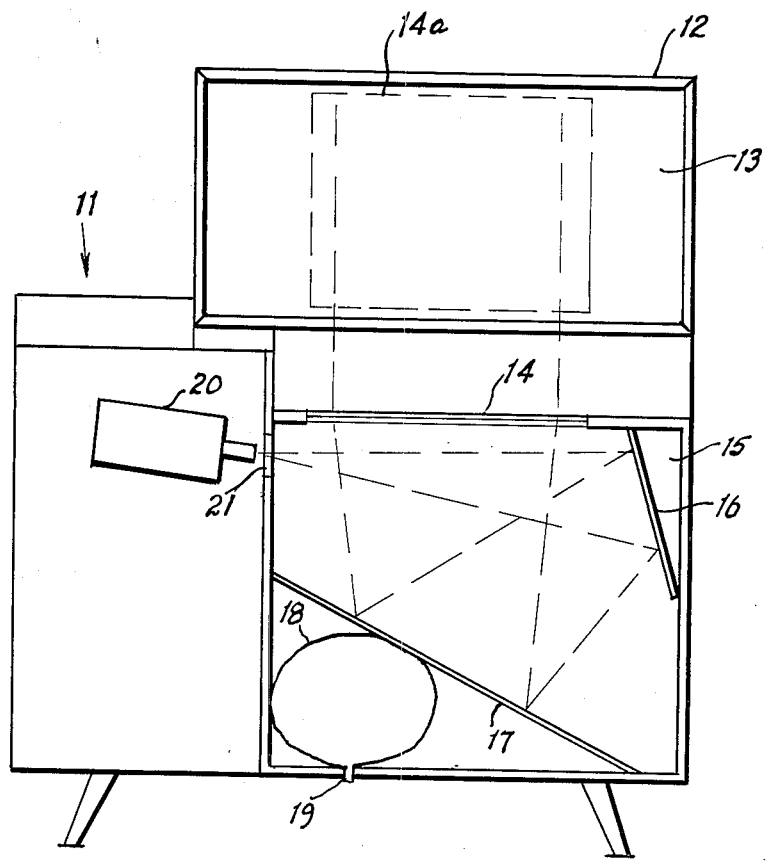
INVENTOR
ARTHUR REGINALD WRIGHT
By Linton and Linton
ATTORNEYS

APPARATUS FOR SCREENING FILMS, SLIDES AND THE LIKE IN ADVERSE LIGHT CONDITIONS

Arthur Reginald Wright, 609 Wellington St., Perth, Western Australia, Australia
Filed June 7, 1963, Ser. No. 286,283
1 Claim. (Cl. 88—24)

This invention relates to apparatus for screening films, slides and the like in adverse light conditions.

It has long been recognised that film and particularly movie films is one of the most effective advertising mediums. One of the major difficulties which has prevented the more widespread use of films for advertising is that in order to obtain a suitable image on the screen, it is necessary to show the film in a theatre or in specially darkened premises. Attempts have been made to use what are known as rear projection screens for daylight viewing, but in general such arrangements are far from satisfactory. The same considerations apply to the screening of individual transparencies or stills. A further difficulty is that to obtain a reasonable sized image, the apparatus must be rather bulky and cumbersome.

The object of the present invention is to provide apparatus for screening films, slides and the like in adverse light conditions which will enable the viewers to see an image comparable with that shown on a screen in a darkened theatre, which will produce an image of reasonable size and which is relatively compact.

It has been found that very satisfactory results can be obtained if the film or the like is projected onto a rear projection screen which is shielded from substantially all direct external light and the screen is viewed through a mirror, one or more front surface mirrors being interposed between the projector and the rear projection screen and said front surface mirrors being housed in a compartment filled with a gas that is substantially dust free and substantially moisture free.

Thus in one form the invention resides in apparatus for screening films and the like in adverse light conditions comprising a rear projection screen which is shielded from substantially all direct external light, one or more projection mirrors to reflect the light beam from a projector for the films, slides and the like onto the rear projection screen and a viewing mirror for viewing the rear projection screen characterised in that the projection mirrors are front surface mirrors and are housed in a compartment filled with a gas which is substantially dust free and substantially moisture free.

The invention will be better understood by reference to the following description of the specific embodiment shown in the accompanying drawing which is a front elevation with the front wall omitted.

In the embodiment shown in the drawings the components of the apparatus are housed in a cabinet 11 the dimensions of which are slightly larger than those of a conventional television set. The cabinet is provided with a lid 12 hingedly mounted on the rear upper edge of the cabinet. The underside of the lid, which is shown in the raised position in the drawing, is fitted with a viewing mirror 13. A rear projection screen 14 is fitted into the cabinet in a substantially horizontal plane a short distance below the upper edge of the cabinet so that the portion of the walls of the cabinet above the screen shield the screen from the external light. The area defined by the broken line 14a represents the image in the mirror 13 of the rear projection screen 14. The rear projection screen is mounted in the upper wall of a hermetically sealed compartment 15 in which are mounted front surface projection mirrors 16 and 17. A breathing lung 18 formed of rubber or like material is positioned within the sealed compartment below the mirror 17, with a tube 19 passing through the wall of the compartment to connect the interior of the lung with the atomsphere. A projector 20 is positioned adjacent a porthole 21 in one wall of the sealed compartment so that it projects onto the mirror 16. After the installation of the mirrors and before the compartment is sealed, the air inside the compartment is withdrawn and replaced by air which is substantially dust free and substantially moisture free. If desired the compartment may be filled with an inert gas such as nitrogen which is substantially moisture free and dust free. The compartment is sealed with the atmospheric temperature around the cabinet as low as possible and with the lung 18 filled with air.

The image thrown onto the mirror 16 by the projector is reflected onto the mirror 17 and then onto the rear projection screen. With the lid adjusted to the appropriate angle, a viewer seated or standing in front of the cabinet is able to see the image projected onto the screen through the viewing mirror 13. As the area of the mirror 13 is greater than that of the rear projection screen 14 it is not necessary for the viewers to stand directly in front of the mirror 13 to view the screen. As the screen is shielded from substantially all direct external light, the image seen by the viewer retains its brilliance whilst the use of front surface mirrors to project the image onto the screen ensures that the distortion of the image is reduced to a minimum whilst obtaining a long throw from the projector to the screen in a confined space. The intersection of the light beam between the projector and the mirror 16 and the light beam between the mirror 17 and the screen does not affect the image thrown onto the screen. The sealing of the front surface mirrors in a compartment filled with a substantially dust free and substantially moisture free gas ensures that the efficiency of the mirrors is retained over a long period. With the sealed compartment some means must be provided to allow for expansion and contraction of the air within the compartment due to changes in temperature and to prevent the entry of dust laden and moisture laden air to the compartment. In the embodiment described above the lung 18 performs this function. As the temperature rises, the expansion of air within the sealed compartment forces air from the lung. As the temperature falls, the contraction of air within the sealed portion allows the lung to expand with air drawn from the atmosphere. Whilst the breathing lung is the most satisfactory means of providing for expansion and contraction of the gas within the sealed compartment, it may be replaced by a breathing hole fitted with a fine filter and a desiccant such as silica gel so that air entering the sealed portion is filtered and dried. It is preferred that a breathing lung be used instead of the breathing hole.

If desired, the viewing mirror 13 may also be a front surface mirror, in which case it is preferably housed in a compartment which is maintained in a substantially dust free and dry condition in the same way as the compartment housing the projection mirrors 16 and 17.

The apparatus described is designed to produce an image at least equal in area to that of a normal 23" television screen, this being a size now generally accepted by the public as being reasonable for most purposes.

I claim:

Apparatus for screening films and the like in adverse light conditions comprising an open top cabinet, a lid pivotally mounted on said cabinet open top, a mirror carried by said lid, a hermetically sealed compartment in said cabinet containing an inert gas which is substantially dust and moisture free and having a wall facing said mirror, said compartment having a second wall, a porthole in said compartment second wall, a rear projection screen providing a part of said compartment first mentioned wall and positioned within said cabinet below the open top thereof, a projector for films, slides and the like positioned exterially of said compartment and within said cabinet for directing light through said compartment porthole, a front surface projection mirror mounted within said compartment and facing said compartment second wall porthole, a second front surface projection mirror mounted within said compartment and facing said rear projection screen and said first mentioned projection mirror and a breathing lung positioned in said compartment and having a tube extending through said compartment.

References Cited by the Examiner
UNITED STATES PATENTS

| | | | |
|---|---|---|---|
| 1,968,267 | 7/1934 | Straubel | 88—32 |
| 2,484,505 | 10/1949 | Hansel | 88—24 |
| 2,901,143 | 8/1959 | Pope | 95—11 |

NORTON ANSHER, *Primary Examiner.*

H. H. FLANDERS, *Assistant Examiner.*